(12) United States Patent
Peng et al.

(10) Patent No.: US 11,979,776 B2
(45) Date of Patent: May 7, 2024

(54) METHOD AND DEVICE FOR DETERMINING A PARAMETER VALUE

(71) Applicant: VIVO MOBILE COMMUNICATION CO., LTD., Guangdong (CN)

(72) Inventors: Shuyan Peng, Dongguan (CN); Zichao Ji, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 350 days.

(21) Appl. No.: 17/376,444

(22) Filed: Jul. 15, 2021

(65) Prior Publication Data

US 2021/0345180 A1   Nov. 4, 2021

Related U.S. Application Data

(63) Continuation of application No. PCT/CN2020/072705, filed on Jan. 17, 2020.

(30) Foreign Application Priority Data

Jan. 18, 2019  (CN) .......................... 201910049780.1

(51) Int. Cl.
*H04W 28/22*   (2009.01)
*H04W 28/02*   (2009.01)
(Continued)

(52) U.S. Cl.
CPC ....... *H04W 28/22* (2013.01); *H04W 28/0263* (2013.01); *H04W 28/0278* (2013.01);
(Continued)

(58) Field of Classification Search
CPC ... H04W 28/22; H04W 72/20; H04W 72/543; H04W 28/0263; H04W 28/0278; H04W 28/24; H04W 72/1263; H04W 92/18
See application file for complete search history.

(56) References Cited

U.S. PATENT DOCUMENTS

2018/0077748 A1   3/2018   Kazmi et al.
2019/0208441 A1   7/2019   Wang et al.
(Continued)

FOREIGN PATENT DOCUMENTS

CN   102164008 A   8/2011
CN   103052164 A   4/2013
(Continued)

OTHER PUBLICATIONS

LG Electronics, "Discussion on resource allocation mechanism for NR V2X". 3GPP TSG RAN WG1 Meeting #95 R1-1812844, Spokane, US, Nov. 12-16, 2018.

(Continued)

*Primary Examiner* — Ajay Cattungal

(74) *Attorney, Agent, or Firm* — Harness, Dickey & Pierce, P.L.C.

(57) ABSTRACT

A method for determining a parameter value includes: in a case that a current time is a parameter value adjustment time, determining a target numerical value of a target parameter at the current time according to a target mode. The target parameter includes at least one of an interference threshold, a signal strength threshold, a channel occupancy rate threshold, a channel busy rate threshold or a distance threshold. The target mode is at least one of: determining the target numerical value according to a target mapping relationship; or according to an initial value of the target parameter and a numerical value adjustment step length, determining the target numerical value.

19 Claims, 3 Drawing Sheets

In a case that a current time is a parameter value adjustment time, determining a target numerical value of a target parameter at the current time according to a target mode, wherein the target parameter comprises at least one of an interference threshold, a signal strength threshold, a channel occupancy rate threshold, a channel busy rate threshold and a distance threshold, the target mode is at least one of the following: determining the target numerical value according to a target mapping relationship, the target mapping relationship includes a mapping relationship between a value of the target parameter and first target information, and the first target information includes at least one of a target time length, a target time length ratio, a value of a counter and the number of times of retransmission; and according to the initial value of the target parameter and the numerical value adjustment step length, determining the target numerical value, wherein the initial value of the target parameter is related to the first target information.  ~ S110

(51) Int. Cl.
 *H04W 28/24* (2009.01)
 *H04W 72/1263* (2023.01)
 *H04W 72/20* (2023.01)
 *H04W 72/543* (2023.01)
 *H04W 92/18* (2009.01)

(52) U.S. Cl.
 CPC ....... *H04W 28/24* (2013.01); *H04W 72/1263* (2013.01); *H04W 72/20* (2023.01); *H04W 72/543* (2023.01); *H04W 92/18* (2013.01)

(56) References Cited

U.S. PATENT DOCUMENTS

| | | | | |
|---|---|---|---|---|
| 2020/0036451 | A1* | 1/2020 | Gilson | H04M 1/72454 |
| 2020/0100284 | A1* | 3/2020 | Li | H04W 74/0808 |
| 2020/0280961 | A1* | 9/2020 | Lee | H04W 4/40 |
| 2020/0296690 | A1* | 9/2020 | Lee | H04W 4/40 |
| 2021/0289473 | A1* | 9/2021 | Chae | H04W 72/0446 |

FOREIGN PATENT DOCUMENTS

| | | |
|---|---|---|
| CN | 107509226 A | 12/2017 |
| CN | 107645774 A | 1/2018 |
| CN | 108541017 A | 9/2018 |
| CN | 108781159 A | 11/2018 |
| EP | 3411996 B1 | 12/2019 |
| EP | 3592025 A1 | 1/2020 |
| JP | 2011166431 A | 8/2011 |
| WO | WO-2018030854 A1 | 2/2018 |
| WO | WO-2018081979 A1 | 5/2018 |

OTHER PUBLICATIONS

Lenovo, "Resource pool for V2V". 3GPP TSG RAN WG1 Meeting #84 bis, R1-162734, Busan, Korea, Apr. 11-15, 2016.

First Office Action of Chinese Priority Application No. 201910049780.1 dated Jun. 21, 2021. Translation provided by Bohui Intellectual Property.

International Search Report and Written Opinion of the International Searching Authority regarding International Patent Application No. PCT/CN2020/072705, dated Apr. 16, 2020. Translation provided by Bohui Intellectual Property.

Supplementary European Search Report regarding Patent Application No. 20741834.4-1215/3914033; PCT/CN2020/072705, dated Feb. 21, 2022.

"On NR sidelink admission control," Ericsson, 3GPP TSG-RAN WG2 #104, R2-1817925, dated Nov. 16, 2018.

"Mode 2a and Mode 2d for NR V2X Resource Allocation," InterDigital Inc., 3GPP RAN WG1 Meeting AH 1901, R1-1900769, dated Jan. 25, 2019.

"Sidelink Resource Allocation Schemes for NR V2X Communication," Intel Corporation, 3GPP TSG RAN WG1 Ad-Hoc Meeting 1901, R1-1900483, dated Jan. 25, 2019.

* cited by examiner

In a case that a current time is a parameter value adjustment time, determining a target numerical value of a target parameter at the current time according to a target mode, wherein the target parameter comprises at least one of an interference threshold, a signal strength threshold, a channel occupancy rate threshold, a channel busy rate threshold and a distance threshold, the target mode is at least one of the following: determining the target numerical value according to a target mapping relationship, the target mapping relationship includes a mapping relationship between a value of the target parameter and first target information, and the first target information includes at least one of a target time length, a target time length ratio, a value of a counter and the number of times of retransmission; and according to the initial value of the target parameter and the numerical value adjustment step length, determining the target numerical value, wherein the initial value of the target parameter is related to the first target information. — S110

FIG. 1

Determining an occupation situation of a transmission resource corresponding to a current time — S210

In a case that the transmission resource is not occupied, adjusting a value of a counter, wherein the counter is applied to resource assignment — S220

FIG. 2

METHOD AND DEVICE FOR DETERMINING A PARAMETER VALUE

CROSS-REFERENCE TO RELATED APPLICATIONS

This application is a Bypass Continuation Application of PCT/CN2020/072705 filed on Jan. 17, 2020, which claims priority to Chinese Patent Application No. 201910049780.1 filed on Jan. 18, 2019, which are incorporated herein by reference in their entirety.

TECHNICAL FIELD

The present disclosure relates to the technical field of communications, and more particularly, to a method and device for determining a parameter value.

BACKGROUND

A sidelink refers to a link on which user equipment (UE) and UE directly communicate with each other without using a network. Long term evolution (LTE) sidelink includes device to device (D2D) communication and vehicle to everything (V2X) communication. A new radio (NR) sidelink currently includes V2X communication. On the LTE Sidelink, two resource assignment modes are supported: a scheduling resource assignment mode and an autonomous resource selection mode of the UE. In the scheduling resource assignment mode, a network device configures resources for the sidelink; and in the autonomous resource selection mode of the UE, the UE periodically reserves certain sources based on the monitoring results for a period of time.

In related art, the parameter value that the UE relies on in the resource monitoring process is a fixed value, which affects the probability that the UE selects appropriate resources and is not favorable for balancing the reliability of the UE and the de-packet rate of the system.

SUMMARY

According to a first aspect, a method for determining a parameter value is provided, applied to user equipment in sidelink communication, where the method includes: in a case that a current time is a parameter value adjustment time, determining a target numerical value of a target parameter at the current time according to a target mode, where the target parameter includes at least one of an interference threshold, a signal strength threshold, a channel occupancy rate threshold, a channel busy rate threshold or a distance threshold, the target mode is at least one of:
  determining the target numerical value according to a target mapping relationship, the target mapping relationship includes a mapping relationship between a value of the target parameter and first target information, and the first target information includes at least one of a target time length, a target time length ratio, a value of a counter and the number of times of retransmission; or
  according to an initial value of the target parameter and a numerical value adjustment step length, determining the target numerical value, where the initial value of the target parameter is related to the first target information.

According to a second aspect, a method for determining a parameter value is provided, applied to user equipment in sidelink communication, where the method includes:
  determining an occupation situation of a transmission resource corresponding to a current time; and
  in a case that the transmission resource is not occupied, adjusting a value of a counter, wherein the counter is applied to resource assignment.

According to a third aspect, user equipment is provided, applied to sidelink communication, where the user equipment includes:
  a processing module, configured to: in a case that a current time is a parameter value adjustment time, determine a target numerical value of a target parameter at the current time according to a target mode, where the target parameter includes at least one of an interference threshold, a signal strength threshold, a channel occupancy rate threshold, a channel busy rate threshold or a distance threshold, the target mode is at least one of:
  determining the target numerical value according to a target mapping relationship, the target mapping relationship includes a mapping relationship between a value of the target parameter and first target information, and the first target information includes at least one of a target time length, a target time length ratio, a value of a counter and the number of times of retransmission; or
  according to an initial value of the target parameter and a numerical value adjustment step length, determine the target numerical value, where the initial value of the target parameter is related to the first target information.

According to a fourth aspect, user equipment is provided, applied to sidelink communication, where the user equipment includes:
  a first processing module, configured to judge an occupation situation of a transmission resource corresponding to a current time; and
  a second processing module, configured to, in a case that the transmission resource is not occupied, adjust a value of a counter, wherein the counter is applied to resource assignment.

According to a fifth aspect, user equipment is provided, applied to sidelink communication, where the user equipment includes: a memory, a processor and a program which is stored in the memory and executable on the processor, where the program, when being executed by the processor, enables the processor to implement the steps of the method for determining the parameter value as defined in the first aspect or the second aspect.

According to a sixth aspect, a non-transitory computer readable medium is provided. The non-transitory computer readable medium stores a program, where the program, when being executed by the processor, enables the processor to implement the steps of the method for determining the parameter value as defined in the first aspect or the second aspect.

BRIEF DESCRIPTION OF DRAWING

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings:

FIG. 1 is a schematic flowchart of a method for determining a parameter value according to an embodiment of the present disclosure.

FIG. 2 is a schematic flowchart of a method for determining a parameter value according to another embodiment of the present disclosure.

DETAILED DESCRIPTION OF EMBODIMENTS

Figure 3:
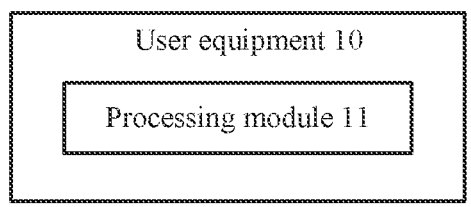
FIG. 3 is a structural schematic diagram of user equipment according to an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

As used in this application, "and/or" means at least one of the connected objects. For example, A and/or B and/or C represents the following seven cases: Only A exists, only B exists, only C exists, both A and B exist, both B and C exist, both A and C exist, or A, B, and C all exist.

The technical solutions of the present disclosure may be applied to various communication systems, for example: a long term evolution (LTE) sidelink system, a new radio (NR) sidelink system, etc.

In the embodiments of the present disclosure, user equipment (UE), which may also be called a mobile terminal, mobile user equipment, etc., may communicate with one or more core networks through a radio access network (RAN). The user equipment may be a mobile terminal, such as a mobile phone (or called "cell" phone) and a computer with a mobile terminal, for example, it may be portable, pocket, handheld, computer in-built or vehicle-mounted mobile devices, which exchange language and/or data with the radio access network.

In the embodiments of the present disclosure, a network device is a device which is deployed in the radio access network for providing a radio communication function for the user equipment. The network device, for example, may be a base station. The base station may be an evolutional node B (referred to as eNB or e-NodeB) in LTE and a 5G base station (gNB).

In the embodiments of the present disclosure, the sidelink may also be called: sidelink. Furthermore, it may be understood that the embodiments of the present disclosure do not limit the specific Chinese translation corresponding to the sidelink.

In the embodiments of the present disclosure, the user equipment may be a transmitting user equipment (transmitting UE) in sidelink communication, and may also be a receiving user equipment (receiving UE) in the sidelink communication.

The technical solutions in various embodiments of the present disclosure are described in detail with reference to the accompanying drawings.

FIG. 1 shows a method for determining a parameter value according to an embodiment of the present disclosure. The method shown in FIG. 1 may be performed by the user equipment in the sidelink communication. As shown in FIG. 1, the method includes:

S110: in a case that a current time is a parameter value adjustment time, a target numerical value of a target parameter at the current time is determined according to a target mode, where the target parameter includes at least one of an interference threshold, a signal strength threshold, a channel occupancy rate threshold, a channel busy rate threshold or a distance threshold, the target mode is at least one of:

determining the target numerical value according to a target mapping relationship, the target mapping relationship includes a mapping relationship between a value of the target parameter and first target information, and the first target information includes at least one of a target time length, a target time length ratio, a value of a counter and the number of times of retransmission; or according to an initial value of the target parameter and a numerical value adjustment step length, the target numerical value is determined, where the initial value of the target parameter is related to the first target information.

It may be understood that in S110, the target time length, the value of the counter and the number of times of retransmission are actually values that change with time. An effective time period of the target numerical value of the target parameter at the current time may be a time period between an effective time of the target numerical value and an effective time of a value of the target parameter at the next adjustment time.

Optionally, as an example, the counter in S110 may be applied to resource assignment.

Optionally, in some embodiments, the target mode is to determine the target numerical value according to the target mapping relationship, where the first target information includes a target time length or a target time length ratio, the target time length includes a first time length or a second time length, the first time length is a time length between a timing start time and the current time, the second time length is a time length between the current time and the latest time meeting a transmission delay requirement, the user equipment does not perform information transmission within the first time length, and the target time length ratio is a ratio of a time length between the timing start time to the current start time to the delay requirement.

In the case where the target mode is to determine the target numerical value according to the target mapping relationship and the first target information includes the target time length, whether the current time is a parameter adjustment time may be determined according to an adjustment time granularity, or whether the current time is the parameter adjustment time may be determined according to the target time length and a preset time length. In the case where the target mode is to determine the target numerical value according to the target mapping relationship and the first target information includes the target time length ratio, whether the current time is a parameter adjustment time may be determined according to an adjustment time granularity, or whether the current time is the parameter adjustment time may be determined according to the target time length ratio and a preset time length ratio. for example, if the delay requirement is 100 ms and the preset time length ratio is 40%, parameter adjustment is triggered when the elapsed time is 40 ms.

The timing start time here may be one of the following times: an arrival time of a data packet, a reception time of second target information and a time indicated by the second target information. When user equipment is transmitting user equipment, the second target information includes at least one of high-level signaling, downlink control information (DCI) or sidelink control information (SCI). In a case where the user equipment is a receiving user equipment, the second target information includes at least one of high-level signaling, DCI, a scheduling request (SR), a buffer status report (BSR), or SCI. The high-level signaling here, for example, may be radio resource control (RRC) signaling, broadcast signaling, sidelink broadcast information or sidelink system information.

It should be noted that the latest time meeting the transmission delay requirement may also be understood as a time when the user equipment determines de-packet, or may be understood that a time interval between the latest time and a generation time of the data packet is the transmission delay requirement.

Take the case where the sum of the first time length and the second time length is a delay L and the target parameter is an interference measurement threshold or a signal strength threshold as an example. If the first time length is t, the second time length res_t=L−t, and a mapping relationship (the mapping relationship may be a table) between the interference measurement threshold or the signal strength threshold and the first time length or the second time length may be pre-defined or pre-configured. According to t=0 or res_t=L and the mapping relationship, an initial value of the interference measurement threshold or the signal strength threshold may be obtained. If the current time is an adjustment time of the interference measurement threshold or the signal strength threshold, a value of the interference measurement threshold or the signal strength threshold may be determined according to the value of t or res_t at the current time and the mapping relationship.

In this example, whether the current time is a parameter adjustment time may be determined according to an adjustment time granularity. Or whether the current time is the parameter adjustment time may be determined according to the first time length or the second time length. For example, if t is greater than T1 or res_t is less than T2 at the current time, the current time is the parameter adjustment time. Here, values of the adjustment time granularity, T1 and T2 may be pre-defined, or may be pre-configured, or may be configured by a network device, or may be configured by user equipment. The adjustment time granularity, for example, may be one of the following granularities: millisecond (ms), a subframe, N slots, multi-slot, N symbols, a frame and a time-pattern, where N is a positive integer greater than or equal to 1.

Or take the case where the target parameter is a channel occupancy rate threshold or a channel busy rate threshold and the first target information includes a value of a counter as an example. A mapping relationship (the mapping relationship may be table) between the channel occupancy rate threshold or the channel busy rate threshold and the value of the counter may be pre-defined or pre-configured. For each parameter adjustment time, a value of the channel occupancy rate threshold or a value of the channel busy rate at each parameter adjustment time may be determined according to the value of the counter of the parameter adjustment time and the mapping relationship. In this example, whether the current time is a parameter adjustment time may be determined according to an adjustment time granularity.

Or take the case where the target parameter is a distance threshold and the first target information includes the number of times of retransmission as an example. A mapping relationship between the distance threshold and the number of times of retransmission may be pre-defined or pre-configured. For each parameter adjustment time, a value of the distance threshold may be determined according to the number of times of retransmission at the parameter adjustment time and the mapping relationship. In this example, whether the current time is a parameter adjustment time may be determined according to an adjustment time granularity. Initial transmission may be considered as that the corresponding number of times of retransmission is 0.

The above distance threshold may be understood as a threshold of a distance between the user equipment and the user equipment. For example, if the number of times of retransmission corresponding to one parameter adjustment time is 0 and the value of the distance threshold is 1000 m, the user equipment considers resources occupied by other user equipment within 1000 m away from itself as occupied resources. If the number of times of retransmission corresponding to the next parameter adjustment time is 1 and the value of the distance threshold is 500 m, the user equipment considers resources occupied by other user equipment within 500 m away from itself as occupied resources.

Optionally, in some embodiments, the target mode is to determine the target numerical value according to the initial value of the target parameter and the numerical value adjustment step length. The method shown in FIG. 1 further includes:

an initial value of the target parameter is determined according to a mapping relationship between an initial value corresponding to the first target information and the value of the target parameter, and the first target information.

It may be understood that when the current time is the parameter adjustment time when the value of the target parameter is adjusted for the first time, the user equipment determines the target numerical value according to the initial value of the target parameter and the numerical value adjustment step length. When the current time is not the parameter adjustment time when the value of the target parameter is adjusted for the first time, the user equipment determines the target numerical value of the target parameter actually according to the value of the target parameter before the current time and the numerical value adjustment step length.

For example, the first target information includes a target time length, where the target time length includes a first time length or a second time length, the first time length is a time length between a timing start time and the current time, the second time length is a time length between the current time and the latest time meeting the transmission delay requirement, and the user equipment does not perform information transmission within the first time length. In this case, whether the current time is a parameter adjustment time may be determined according to an adjustment time granularity, or whether the current time is the parameter adjustment time may be determined according to the target time length and a preset time length.

The timing start time here may be one of the following times: an arrival time of a data packet, an activation time of a counter, a reception time of third target information and a time indicated by the third target information. When user equipment is transmitting user equipment, the third target information includes at least one of high-level signaling, DCI, or SCI. In a case where the user equipment is a receiving user equipment, the third target information includes at least one of high-level signaling, DCI, SR, BSR, or SCI.

Take the case where the sum of the first time length and the second time length is a delay L and the target parameter is an interference measurement threshold or a signal strength threshold as an example. If the first time length is t, the second time length res_t=L−t, and a mapping relationship (the mapping relationship may be a table) between the interference measurement threshold or the signal strength threshold and the first time length or the second time length may be pre-defined or pre-configured. According to t=0 or res_t=L and the mapping relationship, an initial value of the interference measurement threshold or the signal strength threshold may be obtained.

Or take the case where the target parameter is a channel occupancy rate threshold or a channel busy rate threshold and the first target information includes a value of a counter as an example. A mapping relationship (the mapping relationship may be table) between the channel occupancy rate threshold or the channel busy rate threshold and the value of the counter may be pre-defined or pre-configured. An initial value of the channel occupancy threshold or the channel busy rate threshold may be determined according to the value of the counter at the arrival time of the data packet and the mapping relationship.

Or take the case where the target parameter is a distance threshold and the first target information includes the number of times of retransmission as an example. A mapping relationship between the distance threshold and the number of times of retransmission may be pre-defined or pre-configured. An initial value of the distance threshold may be determined according to the mapping relationship and the number of times of retransmission 0.

After the initial value of the target parameter is determined, a numerical value adjustment step length may be further determined. The numerical value adjustment step length may be pre-configured, pre-defined, configured by the network device or configured by the user equipment. The numerical value adjustment step length may also be determined on the basis of the mapping relationship.

In some embodiments, the numerical value adjustment step length is determined by the user equipment according to a mapping relationship between the target time length and the numerical value adjustment step length.

For example, take the case where the sum of the first time length and the second time length is a delay L and the target parameter is an interference measurement threshold as an example. If the first time length is t, the second time length res_t=L−t, a mapping relationship between the interference measurement threshold and the first time length may be pre-defined or pre-configured, and the adjustment time granularity may be pre-defined or pre-configured as 1 slot. Assuming that t is within [a, b], the numerical value adjustment step length is 3 dB; and assuming that t is within [b, c], the numerical value adjustment step length is 6 dB. A=0, b=5, c=50. If t=48 ms, t is within [b, c], and when whether resources are reserved is determined in the next slot, the value of the interference threshold is the value of the interference threshold at the current time minus 6 dB.

In some embodiments, the first target information further includes a granularity of a frequency domain resource unit, and the numerical value adjustment step length is determined by the user equipment according to a mapping relationship between the granularity of the frequency domain resource unit and the numerical value adjustment step length. Or the numerical value adjustment step length is determined by the user equipment according to a mapping relationship between the number of times of retransmission and the numerical value adjustment step length. Here, the retransmissions at different times correspond to different numerical value adjustment step lengths, which can balance reliability and system congestion.

It may be understood that the above solution for determining the initial value and determining the numerical value adjustment step length according to the mapping relationship at least includes the following technical solutions: (1) the initial value of the target parameter is determined according to the initial value of the target time length, and the numerical value adjustment step length is determined according to the mapping relationship between the target time length and the numerical value adjustment step length; (2) the initial value of the target parameter is determined according to the initial value of the target time length, and the numerical value adjustment step length is determined according to the mapping relationship between the granularity of the frequency domain resource unit and the numerical value adjustment step length; (3) the initial value of the target parameter is determined according to the initial value of the target time length, and the numerical value adjustment step length is determined according to the mapping relationship between the number of times of retransmission and the numerical value adjustment step length; (4) the initial value of the target parameter is determined according to the initial value of the counter, and the numerical value adjustment step length is determined according to the mapping relationship between the target time length and the numerical value adjustment step length; (5) the initial value of the target parameter is determined according to the initial value of the counter, and the numerical value adjustment step length is determined according to the mapping relationship between the granularity of the frequency domain resource unit and the numerical value adjustment step length; (6) the initial value of the target parameter is determined according to the initial value of the counter, and the numerical value adjustment step length is determined according to the mapping relationship between the number of times of retransmission and the numerical value adjustment step length; (7) the initial value of the target parameter is determined according to the number of times of retransmission being 0, and the numerical value adjustment step length is determined according to the mapping relationship between the target time length and the numerical value adjustment step length; (8) the initial value of the target parameter is determined according to the number of times of retransmission being 0, and the numerical value adjustment step length is determined according to the mapping relationship between the granularity of the frequency domain resource unit and the numerical value adjustment step length; and (9) the initial value of the target parameter is determined according to the number of times of retransmission being 0, and the numerical value adjustment step length is determined according to the mapping relationship between the number of times of retransmission and the numerical value adjustment step length.

As a specific example, a method for determining a parameter value may include the following steps:

Step 1: a mapping relationship between a value of a counter and a priority is pre-defined, and a mapping relationship between a value of a reference signal receiving power (RSRP) threshold and a second time length is pre-configured, where an adjustment time granularity is N and a numerical value adjustment step length is A.

Step 2: a data packet arrives at the time n of transmission time interval (TTI), and according to a priority of the data packet, and the mapping relationship between the value of the counter and the priority, the value of the counter is initialized as M.

Step 3: in a case that M=0, information is transmitted on the current slot. In a case that M>0, whether the current TTI is occupied is determined.

For example, when whether the current TTI is occupied is determined, a value RSRP_thresh of the RSRP threshold is obtained according to the second time length, and the mapping relationship between the second time length and the value of the RSRP threshold.

It may be understood that the initial value of the RSRP threshold corresponding to TTI n is RSRP_thresh_initial, at TTI n×k×N, it is necessary to adjust the value of the RSRP threshold, the value of the RSRP threshold corresponding to TTI n×k×N is RSRP_thresh_initial−k×A, k=1,2,3 . . . floor (L/N), L is delay. The value of the RSRP threshold maintains unchanged at other times, that is, the value of the corresponding RSRP threshold at other times except for the time when the value of the RSRP threshold is initialized or the value of the RSRP threshold is adjusted maintains consistent with the previous TTI at this time.

When whether the current TTI is occupied is determined, RSRP on resources where scheduling assignment (SA) is located may be measured. In a case that RSRP is greater than RSRP_thresh, the current TTI is considered to be occupied.

Step 4: in a case that the current TTI is occupied, the value of the counter maintains unchanged, TTI+1; and in a case that the current TTI is not occupied, the value of the counter decreases progressively, TTI+1.

Step 5: in a case that the value of the counter is less than or equal to 0, information is transmitted at the next available TTI, otherwise, the step 3 and the subsequent steps are performed.

It should be noted that the above steps 1-5 do not limit the method steps, and the sequence of the above steps are specifically determined by a logical relationship between the steps.

FIG. 2 shows a method for determining a parameter value according to another embodiment of the present disclosure. The method shown in FIG. 2 may be performed by the user equipment in the sidelink communication. As shown in FIG. 2, the method includes:

S210: an occupation situation of a transmission resource corresponding to a current time is determined; and S220: in a case that the transmission resource is not occupied, a value of a counter is adjusted, where the counter is applied to resource assignment.

Optionally, in the S210, the occupation situation of the transmission resource corresponding to the current time may be determined according to at least one of the following modes:

according to scheduling assignment (SA) information, the occupation situation of the transmission resource is determined, where the SA information is used to schedule the transmission resource corresponding to the current time;

according to measurement information of SA information, the occupation situation of the transmission resource corresponding to the current time is determined;

according to measurement information of information indicated by the SA information, the occupation situation of the transmission resource corresponding to the current time is determined; or according to measurement information of the transmission resource indicated by the SA information, the occupation situation of the transmission resource corresponding to the current time is determined.

As an embodiment, in the S210, according to SA information, the occupation situation of the transmission resource is determined, where the SA information is used to schedule the transmission resource corresponding to the current time.

For example, SA is demodulated to obtain a business priority of the data packet. In a case that the obtained business priority is higher than the priority of to-be-transmitted business, it is determined that the transmission resource is not occupied.

As an embodiment, in the S210, according to measurement information of SA information, the occupation situation of the transmission resource corresponding to the current time is determined, where the SA information is used to schedule the transmission resource corresponding to the current time.

For example, received signal strength indication (RSSI) of SA is measured; and in a case that the RSSI is higher than a threshold value, it is considered that the transmission resource is not occupied. Furthermore, it may be understood that the threshold value of the RSSI may be adjusted according to the method shown in FIG. 1.

As an embodiment, in the S210, according to measurement information of information indicated by SA information, the occupation situation of the transmission resource corresponding to the current time is determined, where the SA information is used to schedule the transmission resource corresponding to the current time; or according to the measurement information of the transmission resource indicated by the SA information, the occupation situation of the transmission resource corresponding to the current time is determined, where the SA information is used to schedule the transmission resource corresponding to the current time.

For example, RSRP of data indicated by SA is measured; and in a case that the RSRP is higher than a threshold value, it is considered that the transmission resource is not occupied. Furthermore, it may be understood that the threshold value of the RSRP may be adjusted according to the method shown in FIG. 1.

In the S220, the adjustment granularity of the value of the counter is a time domain adjustment granularity, or the adjustment granularity of the value of the counter is a time frequency domain adjustment granularity.

The time domain adjustment granularity here may be one of slot, ms and time-pattern, the time domain granularity in the time frequency domain adjustment granularity is one of slot, ms and time-pattern, and the frequency domain granularity in the time frequency domain adjustment granularity is one of a sub-channel, a resource block (RB) and F resource block groups (RBG).

Optionally, the method shown in FIG. 2 further includes: an initial value of the counter is determined.

Optionally, in some embodiments, the initial value is determined according to a quality of service (QoS) requirement and a first mapping relationship, where the first mapping relationship includes a mapping relationship between the QoS requirement and an initial value range. The QoS requirement here may include at least one of priority, delay, reliability, or business type.

For example, in some embodiments, the step that the initial value is determined according to the QoS requirement and the first mapping relationship includes: the target initial value range of the initial value is determined according to the first mapping relationship; and the initial value is determined from the target initial value range according to first target information, where the first target information includes at least one of a geographic position of user equipment, a speed of the user equipment, a distance between the user equipment, a density of the user equipment within a preset area range, a bearing type, a business type, a size of a packet, or an arrival rate of the packet. The arrival rate of the packet here may be understood as the generation frequency of the data packet.

That is, the value range of the initial value of the counter may be determined on the basis of the QoS requirement, and then one value is further selected from the initial value range according to the first target information to serve as the initial value of the counter.

For example, a mapping relationship between the priority and the value range of the initial value of the counter is pre-configured, where the mapping relationship here may be a one-to-many, many-to-one or many-to-many mapping relationship.

In a case that the mapping relationship is the one-to-many or many-to-many mapping relationship, the value range of the initial value of the counter may be selected according to the configured priority, and then one value is randomly selected from the value range to serve as the initial value of the counter. Or the value range of the initial value of the counter is selected according to the configured priority, and then one value is selected according to ID of the user equipment or the geographical position of the user equipment to serve as the initial value of the counter; therefore, the initial values of the counters corresponding to different user equipment with the same priority may be different. Or the value range of the initial value of the counter is selected according to the configured priority, and then one value is selected from the value range based on the indication of DCI or SCI to serve as the initial value of the counter. In this case, the DCI or SCI may indicate the sequence number of the initial value of the counter in the value range, and may also directly indicate the initial value.

Optionally, in some embodiments, the initial value is determined according to second target information and a second mapping relationship, where the second mapping relationship includes a mapping relationship between the second target information and the initial value, and the second target information includes at least one of a QoS requirement, a geographical position of user equipment, a speed of the user equipment, a distance between the user equipment, a density of the corresponding user equipment in a preset area range, a bearing type, a business type, a size of a packet, or an arrival rate of the packet. That is, the initial value may be determined directly according to the mapping relationship between the second target information and the initial value.

It may be understood that in a case that the user equipment is configured with different types of counters, the initial value of each type of counter may be determined according to the above method for determining the initial value, and the initial value of each type of counter may be configured with different or same value, which is not limited by the embodiment of the present disclosure.

The method for determining the parameter value according to the embodiments of the present disclosure is described above in detail with reference to FIG. 1 and FIG. 2. The user equipment according to the embodiment of the present disclosure is described below in detail with reference to FIG. 3.

FIG. 3 is a structural schematic diagram of user equipment according to an embodiment of the present disclosure. The user equipment shown in FIG. 3 is applied to sidelink communication. As shown in FIG. 3, the user equipment 10 includes:

a processing module, configured to: in a case that a current time is a parameter value adjustment time, determine a target numerical value of a target parameter at the current time according to a target mode, where the target parameter includes at least one of an interference threshold, a signal strength threshold, a channel occupancy rate threshold, a channel busy rate threshold or a distance threshold, the target mode is at least one of:

determining the target numerical value according to a target mapping relationship, the target mapping relationship includes a mapping relationship between a value of the target parameter and first target information, and the first target information includes at least one of a target time length, a target time length ratio, a value of a counter and the number of times of retransmission; or according to an initial value of the target parameter and a numerical value adjustment step length, determine the target numerical value, where the initial value of the target parameter is related to the first target information.

Optionally, as an embodiment, the target mode is to determine the target numerical value according to the target mapping relationship, where the first target information includes a target time length or a target time length ratio, the target time length includes a first time length or a second time length, the first time length is a time length between a timing start time and the current time, the second time length is a time length between the current time and the latest time meeting the transmission delay requirement, the user equipment does not perform information transmission within the first time length, and the target time length ratio is a ratio of the time length between the timing start time and the current time to the delay requirement.

Optionally, as an embodiment, the timing start time is one of the following times: an arrival time of a data packet, a reception time of second target information and a time indicated by the second target information; and in the case where the user equipment is a transmitting user equipment, the second target information includes at least one of high-level signaling, downlink control information (DCI) or sidelink control information (SCI).

Optionally, as an embodiment, in the case where the user equipment is a receiving user equipment, the second target information includes at least one of high-level signaling, DCI, a scheduling request (SR), a buffer status report (BSR) or SCI.

Optionally, as an embodiment, the target mode is to determine the target numerical value according to the initial value of the target parameter and the numerical value adjustment step length. The processing module 11 is further configured to:

determine an initial value of the target parameter according to a mapping relationship between an initial value corresponding to the first target information and the value of the target parameter, and the first target information.

Optionally, as an embodiment, the first target information includes a target time length, where the target time length includes a first time length or a second time length, the first time length is a time length between a timing start time and the current time, the second time length is a time length between the current time and the latest time meeting a transmission delay requirement, and the user equipment does not perform information transmission within the first time length.

Optionally, as an embodiment, the timing start time is one of the following times: an arrival time of a data packet, an activation time of the counter, a reception time of third target information and a time indicated by the third target information; and in the case where the user equipment is a transmitting user equipment, the third target information includes at least one of high-level signaling, DCI or SCI.

Optionally, as an embodiment, in the case where the user equipment is a receiving user equipment, the third target information includes at least one of high-level signaling, DCI, SR, BSR or SCI.

Optionally, as an embodiment, the processing module 11 is further configured to:

according to an adjustment time granularity, determine whether the current time is a parameter adjustment time.

Optionally, as an embodiment, the adjustment time granularity is determined by one of the following modes: pre-definition, pre-configuration, network device configuration and user equipment configuration.

Optionally, as an embodiment, the processing module 11 is further configured to:

according to the target time length and a preset time length, determine whether the current time is a parameter adjustment time.

Optionally, as an embodiment, the numerical value adjustment step length is determined by the user equipment according to a mapping relationship between the target time length and the numerical value adjustment step length.

Optionally, as an embodiment, the first target information further includes a granularity of a frequency domain resource unit, and the numerical value adjustment step length is determined by the user equipment according to a mapping relationship between the granularity of the frequency domain resource unit and the numerical value adjustment step length.

Optionally, as an embodiment, the numerical value adjustment step length is determined by the user equipment according to a mapping relationship between the number of times of retransmission and the numerical value adjustment step length.

The user equipment provided by the embodiment of the present disclosure can realize each process of implementing the user equipment in the embodiment of the method in FIG. 1, which is not elaborated here to avoid repetition.

Figure 4:
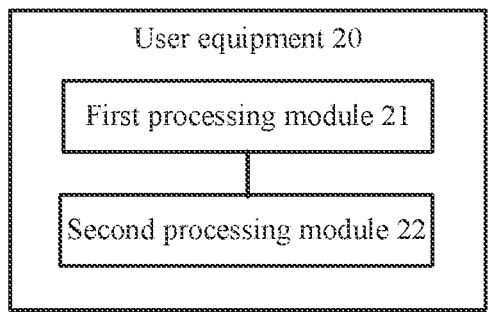
FIG. 4 is a structural schematic diagram of user equipment according to another embodiment of the present disclosure.

FIG. 4 is a structural schematic diagram of user equipment according to another embodiment of the present disclosure. The user equipment shown in FIG. 4 is applied to sidelink communication. The user equipment 20 shown in FIG. 4 includes:

a first processing module 21, configured to judge an occupation situation of a transmission resource corresponding to a current time; and a second processing module 22, configured to, in a case that the transmission resource is not occupied, adjust a value of a counter, where the counter is applied to resource assignment.

Optionally, as an embodiment, the first processing module 21 is configured to:

according to scheduling assignment (SA) information, judge the occupation situation of the transmission resource, where the SA information is used to schedule the transmission resource corresponding to the current time.

Optionally, as an embodiment, the first processing module 21 is configured to:

according to measurement information of SA information, judge the occupation situation of the transmission resource corresponding to the current time, where the SA information is used to schedule the transmission resource corresponding to the current time.

Optionally, as an embodiment, the first processing module 21 is configured to:

according to measurement information of information indicated by SA information, judge the occupation situation of the transmission resource corresponding to the current time, where the SA information is used to schedule the transmission resource corresponding to the current time; or according to measurement information of a transmission resource indicated by SA information, judge the occupation situation of the transmission resource corresponding to the current time, where the SA information is used to schedule the transmission resource corresponding to the current time.

Optionally, as an embodiment, the adjustment granularity of the value of the counter is a time domain adjustment granularity, or the adjustment granularity of the value of the counter is a time frequency domain adjustment granularity.

Optionally, as an embodiment, the first processing module 21 is further configured to:

determine an initial value of the counter.

Optionally, as an embodiment, the first processing module 21 is configured to:

determine the initial value according to a quality of service (QoS) requirement and a first mapping relationship, where the first mapping relationship includes a mapping relationship between the QoS requirement and an initial value range.

Optionally, as an embodiment, the first processing module 21 is configured to:

determine a target initial value range where the initial value is located according to the first mapping relationship; and determine the initial value from the target initial value range according to first target information, where the first target information includes at least one of a geographic position of user equipment, a speed of the user equipment, a distance between the user equipment, a density of the user equipment within a preset area range, a bearing type, a business type, a size of a packet or an arrival rate of the packet.

Optionally, as an embodiment, the first processing module 21 is configured to:

determine the initial value according to second target information and a second mapping relationship, where the second mapping relationship includes a mapping relationship between the second target information and the initial value, and the second target information includes at least one of a QoS requirement, a geographical position of user equipment, a speed of the user equipment, a distance between the user equipment, a density of the user equipment within a preset area range, a bearing type, a business type, a size of a packet, or an arrival rate of the packet.

The user equipment provided by the embodiment of the present disclosure can realize each process of implementing the user equipment in the embodiment of the method in FIG. 2, which is not elaborated here to avoid repetition.

Figure 5:
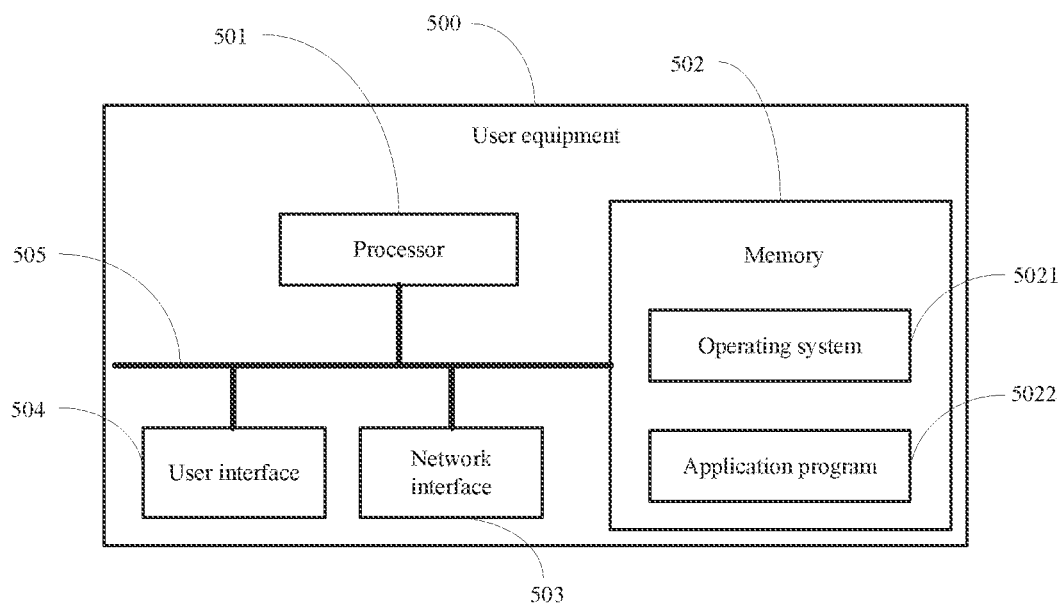
FIG. 5 is a structural schematic diagram of user equipment according to yet another embodiment of the present disclosure.

FIG. 5 is a block diagram of user equipment according to another embodiment of the present disclosure. The user equipment 500 shown in FIG. 5 includes: at least one processor 501, a memory 502, a user interface 503 and at least one network interface 504. The components in the user equipment 500 are coupled together through a bus system 505. It may be understood that the bus system 505 is configured to implement connection and communication between these components. In addition to a data bus, the bus system 505 further includes a power bus, a control bus and a status signal bus. However, for clear description, various buses are marked as the bus system 505 in FIG. 5.

The user interface 503 may include a display, a keyboard, a clicking device (for example: a mouse and a trackball), a touch panel or a touchscreen.

It may be understood that the memory 502 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory (DRRAM). The memory 502 of the system and the method described in the embodiments of the present disclosure is intended to include, but is not limited to, these and any other suitable types of memories.

In some implementations, the memory 502 stores the following elements: executable modules or data structures, a subset thereof, or an extended set thereof: an operating system 5021 and an application program 5022.

The operating system 5021 includes various system programs, such as a framework layer, a core library layer, and a driver layer, and is configured to implement various basic services and process hardware-based tasks. The application program 5022 includes various application programs, for example, a media player and a browser, and is configured to implement various application services. A program implementing the method in the embodiments of the present disclosure may be included in the application program 5022.

In the embodiments of the present disclosure, the user equipment 500 further includes: a computer program which is stored in a memory 502 and executable on a processor 501, where the computer program, when being executed by a processor 501, enables the processor to implement each process of the method in FIG. 1 and FIG. 2. The same technical effect can be achieved. In order to avoid repetition, details are not described herein again.

The method disclosed in the embodiment of the present disclosure may be applied to the processor 501 or implemented by the processor 501. The processor 501 may be an integrated circuit chip having a signal processing capability. During implementation, the steps of the foregoing method may be completed by hardware integrated logic circuits in the processor 501 or instructions in a form of software. The above processor 501 may be a general-purpose processor, a digital signal processor (DSP), an application specific integrated circuit (ASIC), a field programmable gate array (FPGA) or other programmable logic devices, a discrete gate or transistor logic device, and a discrete hardware component. The processor may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly performed by a hardware decoding processor or by a combination of hardware and software modules in the decoding processor. The software module may be located in a mature non-transitory computer-readable storage medium in this field such as a random access memory, a flash memory, a read-only memory, a programmable read-only memory or an electrically erasable programmable memory, or a register. The non-transitory computer-readable storage medium is located in the memory 502, and the processor 501 reads information from the memory 502 and completes the steps of the foregoing method in combination with hardware of the processor 501. For example, the non-transitory computer readable storage medium stores a computer program, and when the computer program is executed by the processor 501, the steps of the method embodiments shown in FIG. 1 to FIG. 2 are implemented.

It may be understood that the embodiments described in the embodiments of the present disclosure may be implemented by hardware, software, firmware, middleware, microcode, or a combination thereof. For implementation with hardware, the processing module may be implemented in one or more application specific integrated circuits (ASIC), a digital signal processor (DSP), a DSP device (DSPD), a programmable logic device (PLD), a field-programmable gate array (FPGA), general processors, controllers, micro-controllers, micro-processors, and other electronic units for implementing the functions of the present disclosure, or their combinations.

For implementation with software, technologies described in the embodiments of the present disclosure may be implemented by executing functional modules (for example, a process and a function) in the embodiments of the present disclosure. Software code can be stored in the memory and executed by the processor. The memory can be implemented inside or outside the processor.

The embodiments of the present disclosure further provide a non-transitory computer-readable storage medium. The non-transitory computer-readable storage medium stores a computer program, and when a processor executes the computer program, the processes of the foregoing method embodiment are implemented and the same technical effect can be achieved. To avoid repetition, details are not described herein again. The non-transitory computer readable storage medium is, for example, a read-only memory (ROM for short), a random access memory (RAM for short), a magnetic disk, or an optical disk.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

By means of the foregoing description of the embodiments, a person skilled in the art may clearly understand that the method in the foregoing embodiments may be implemented by software with a necessary general hardware platform. The method in the foregoing embodiments may also be implemented by hardware. However, in many cases, the former is a preferred implementation. Based on the understanding, the technical solutions of the present disclosure essentially or the part that contributes to the prior art may be embodied in the form of software products. The computer software product is stored in a storage medium (such as ROM/RAM, a magnetic disk and an optical disk), including several instructions for enabling one terminal (which may be a mobile phone, a computer, a server, an air conditioner, or a network device) to implement the method in each embodiment of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

What is claimed is:

1. A method for determining a parameter value, performed by a user equipment in sidelink communication, comprising:
   determining that a current time is a parameter value adjustment time; and
   determining a target numerical value of a target parameter at the current time according to a target mode, wherein the target parameter comprises at least one of an interference threshold, a signal strength threshold, a channel occupancy rate threshold, a channel busy rate threshold or a distance threshold, and the target mode being at least one of:
      determining the target numerical value according to a target mapping relationship, wherein the target mapping relationship comprises a mapping relationship between a value of the target parameter and first target information, and the first target information comprises at least one of a target time length, a target time length ratio, a value of a counter or the number of times of retransmission; or
      according to an initial value of the target parameter and a numerical value adjustment step length, determining the target numerical value, wherein the initial value of the target parameter is related to the first target information;
   wherein the target numerical value of the target parameter is used to perform resource monitoring by the user equipment.

2. The method according to claim 1, wherein the target mode is to determine the target numerical value according to the target mapping relationship;
   the first target information comprising a target time length or a target time length ratio, the target time length comprising a first time length or a second time length, the first time length being a time length between a timing start time and the current time, the second time length being a time length between the current time and the latest time meeting the transmission delay requirement, the user equipment not performing information transmission within the first time length, and the target time length ratio being a ratio of the time length between the timing start time and the current time to the delay requirement.

3. The method according to claim 2, wherein the timing start time is one of following times: an arrival time of a data packet, a reception time of second target information and a time indicated by the second target information; and
   in a case where the user equipment is a transmitting user equipment, the second target information comprises at least one of high-level signaling, downlink control information (DCI) or sidelink control information (SCI); or
   in a case where the user equipment is a receiving user equipment, the second target information comprises at least one of high-level signaling, DCI, a scheduling request (SR), a buffer status report (BSR) or SCI.

4. The method according to claim 2, further comprising:
   according to the target time length and a preset time length, determining whether the current time is a parameter adjustment time.

5. The method according to claim 1, the target mode being to adjust the step length according to the initial value and the numerical value of the target parameter, the method further comprising:
   determining the initial value of the target parameter according to a mapping relationship between an initial value corresponding to the first target information and the value of the target parameter, and the first target information.

6. The method according to claim 5, wherein the first target information comprises a target time length, the target time length comprising a first time length or a second time length, the first time length being a time length between a timing start time and the current time, the second time length being a time length between the current time and the latest time meeting the transmission delay requirement, and the user equipment not performing information transmission within the first time length.

7. The method according to claim 6, wherein the timing start time is one of following times: an arrival time of a data packet, an activation time of the counter, a reception time of third target information and a time indicated by the third target information; and
   in a case where the user equipment is a transmitting user equipment, the third target information comprises at least one of high-level signaling, downlink control information (DCI), or sidelink control information (SCI); or
   in a case where the user equipment is a receiving user equipment, the third target information comprises at least one of high-level signaling, DCI, a scheduling request (SR), a buffer status report (BSR), or SCI.

8. The method according to claim 5, wherein the numerical value adjustment step length is determined by the user equipment according to a mapping relationship between the target time length and the numerical value adjustment step length.

9. The method according to claim 5, wherein the first target information further comprises a granularity of a frequency domain resource unit, and the numerical value adjustment step length is determined by the user equipment according to a mapping relationship between the granularity of the frequency domain resource unit and the numerical value adjustment step length; or the numerical value adjustment step length is determined by the user equipment according to a mapping relationship between the number of times of retransmission and the numerical value adjustment step length.

10. The method according to claim 1, further comprising: according to an adjustment time granularity, determining whether the current time is a parameter adjustment time.

11. A method for determining a parameter value, performed by a user equipment in sidelink communication, comprising:
determining an occupation situation of a transmission resource corresponding to a current time;
in a case that the transmission resource is not occupied, adjusting a value of a counter, wherein the counter is applied to resource assignment; and
determining an initial value of the counter, wherein
the determining the initial value of the counter comprises:
determining the initial value according to a quality of service (QoS) requirement and a first mapping relationship, the first mapping relationship comprising a mapping relationship between the QoS requirement and an initial value range; or
determining the initial value according to second target information and a second mapping relationship, the second mapping relationship comprising a mapping relationship between the second target information and the initial value, and the second target information comprising at least one of a QoS requirement, a geographical position of user equipment, a speed of the user equipment, a distance between the user equipment, a density of the user equipment within a preset area range, a bearing type, a business type, a size of a packet or an arrival rate of the packet.

12. The method according to claim 11, wherein the determining an occupation situation of a transmission resource corresponding to a current time comprises:
according to scheduling assignment (SA) information, determining the occupation situation of the transmission resource, wherein the SA information is used to schedule the transmission resource corresponding to the current time;
and/or,
the determining an occupation situation of a transmission resource corresponding to a current time comprises:
according to measurement information of SA information, determining the occupation situation of the transmission resource corresponding to the current time, wherein the SA information is used to schedule the transmission resource corresponding to the current time;
and/or,
the determining an occupation situation of a transmission resource corresponding to a current time comprises:
according to measurement information of information indicated by SA information, determining the occupation situation of the transmission resource corresponding to the current time, wherein the SA information is used to schedule the transmission resource corresponding to the current time; or
according to measurement information of a transmission resource indicated by SA information, determining the occupation situation of the transmission resource corresponding to the current time, wherein the SA information is used to schedule the transmission resource corresponding to the current time.

13. The method according to claim 11, wherein an adjustment granularity of the value of the counter is a time domain adjustment granularity, or the adjustment granularity of the value of the counter is a time frequency domain adjustment granularity.

14. The method according to claim 11, wherein the determining the initial value according to the QoS requirement and the first mapping relationship comprises:
determining a target initial value range where the initial value is located according to the first mapping relationship; and
determining the initial value from the target initial value range according to first target information, the first target information comprising at least one of a geographic position of user equipment, a speed of the user equipment, a distance between the user equipment, a density of the user equipment within a preset area range, a bearing type, a business type, a size of a packet or an arrival rate of the packet.

15. A user equipment, applied to sidelink communication, comprising: a memory, a processor and a program which is stored in the memory and executable on the processor, wherein the program, when executed by the processor, causes the processor to perform steps of the method for determining a parameter value according to claim 11.

16. A user equipment, applied to sidelink communication, comprising:
a memory, a processor and a program which is stored in the memory and executable on the processor, wherein the program, when executed by the processor, causes the processor to perform:
determining that a current time is a parameter value adjustment time; and
determining a target numerical value of a target parameter at the current time according to a target mode, wherein the target parameter comprises at least one of an interference threshold, a signal strength threshold, a channel occupancy rate threshold, a channel busy rate threshold or a distance threshold, the target mode is at least one of:
determining the target numerical value according to a target mapping relationship, wherein the target mapping relationship comprises a mapping relationship between a value of the target parameter and first target information, and the first target information comprises at least one of a target time length, a target time length ratio, a value of a counter or the number of times of retransmission; or
according to an initial value of the target parameter and a numerical value adjustment step length, determining the target numerical value, wherein the initial value of the target parameter is related to the first target information;
wherein the target numerical value of the target parameter is used to perform resource monitoring by the user equipment.

17. The user equipment according to claim 16, wherein the target mode is to determine the target numerical value according to the target mapping relationship,
the first target information comprising a target time length or a target time length ratio, the target time length comprising a first time length or a second time length, the first time length being a time length between a timing start time and the current time, the second time length being a time length between the current time and the latest time meeting the transmission delay requirement, the user equipment not performing information transmission within the first time length, and the target time length ratio being a ratio of the time length between the timing start time and the current time to the delay requirement.

18. The user equipment according to claim 17, wherein the timing start time is one of following times: an arrival time of a data packet, a reception time of second target information and a time indicated by the second target information; and in a case where the user equipment is a transmitting user equipment, the second target information comprises at least one of high-level signaling, downlink control information (DCI) or sidelink control information (SCI); or in a case where the user equipment is a receiving user equipment, the second target information comprises at least one of high-level signaling, DCI, a scheduling request (SR), a buffer status report (BSR) or SCI.

19. The user equipment according to claim 16, wherein the target mode is to adjust the step length according to the initial value and the numerical value of the target parameter; and the program, when executed by the processor, causes the processor to further perform:

determining the initial value of the target parameter according to a mapping relationship between an initial value corresponding to the first target information and the value of the target parameter, and the first target information.

\* \* \* \* \*